United States Patent

Dai

(10) Patent No.: US 8,162,578 B2
(45) Date of Patent: Apr. 24, 2012

(54) ADJUSTABLE FASTENER

(75) Inventor: Bin Dai, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 191 days.

(21) Appl. No.: 12/469,840

(22) Filed: May 21, 2009

(65) Prior Publication Data

US 2010/0119328 A1 May 13, 2010

(30) Foreign Application Priority Data

Nov. 12, 2008 (CN) .......................... 2008 1 0305485

(51) Int. Cl.
*F16B 37/04* (2006.01)
(52) U.S. Cl. ........................................ 411/180; 411/546
(58) Field of Classification Search .................. 411/535, 411/537, 542, 544, 546, 917, 68, 32, 429, 411/10, 11, 6, 178–181, 183, 427
See application file for complete search history.

(56) References Cited

U.S. PATENT DOCUMENTS

| 2,899,486 | A | * | 8/1959 | Abrams | 174/166 S |
|---|---|---|---|---|---|
| 3,013,643 | A | | 12/1961 | Perry | |
| 3,316,952 | A | * | 5/1967 | Hollinger | 411/301 |
| 4,130,138 | A | * | 12/1978 | Swanstrom | 138/109 |
| 4,362,449 | A | * | 12/1982 | Hlinsky | 411/156 |
| 4,895,115 | A | * | 1/1990 | Weber et al. | 123/195 A |
| 5,017,328 | A | * | 5/1991 | Mazurek | 267/136 |
| 5,314,280 | A | * | 5/1994 | Gagliardi et al. | 411/182 |
| 5,393,182 | A | * | 2/1995 | Berecz | 411/369 |
| 5,454,675 | A | * | 10/1995 | DeHaitre | 411/303 |
| 5,904,461 | A | * | 5/1999 | McKarge, Jr. | 411/302 |
| 6,095,738 | A | * | 8/2000 | Selle | 411/427 |
| 6,637,994 | B2 | * | 10/2003 | Leistner | 411/181 |
| 6,776,566 | B2 | * | 8/2004 | Kobusch et al. | 411/546 |
| 6,854,943 | B2 | * | 2/2005 | Nagayama | 411/429 |
| 7,052,552 | B2 | * | 5/2006 | Kwan et al. | 118/697 |
| 2003/0152442 | A1 | * | 8/2003 | Curley et al. | 411/427 |
| 2008/0292427 | A1 | * | 11/2008 | Rowe et al. | 411/339 |

* cited by examiner

*Primary Examiner* — Gary Estremsky
(74) *Attorney, Agent, or Firm* — Altis Law Group, Inc.

(57) ABSTRACT

An adjustable fastener includes a main body and an elastic portion. The elastic portion is connected to an end of the main body. The elastic portion is deformable thus changing a total length of the adjustable fastener.

10 Claims, 4 Drawing Sheets

ADJUSTABLE FASTENER

BACKGROUND

1. Technical Field

The present disclosure generally relates to fasteners and, particularly, to an adjustable fastener with a threaded portion.

2. Description of Related Art

Fasteners connect two or more components together. A typical fastener includes a flange and a threaded hole to receive a threaded component, such as a bolt. The flange is riveted to a panel, and the bolt is engaged in the threaded hole of the fastener with another panel located between a cap of the bolt and the fastener, thereby connecting the two panels.

However, machining errors of the fastener, the bolt, and the panels may result in improper fastening caused by unfavorable tolerance stackups such as clamping distance and out of specification parallelism between the panels. In some cases, for example, a front frame and a rear frame of a display device, a proper distance and parallelism are critical. Thus, the typical fastener does not satisfy the requirement.

Therefore, a new fastener is desired to overcome the above-described shortcomings.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 3:
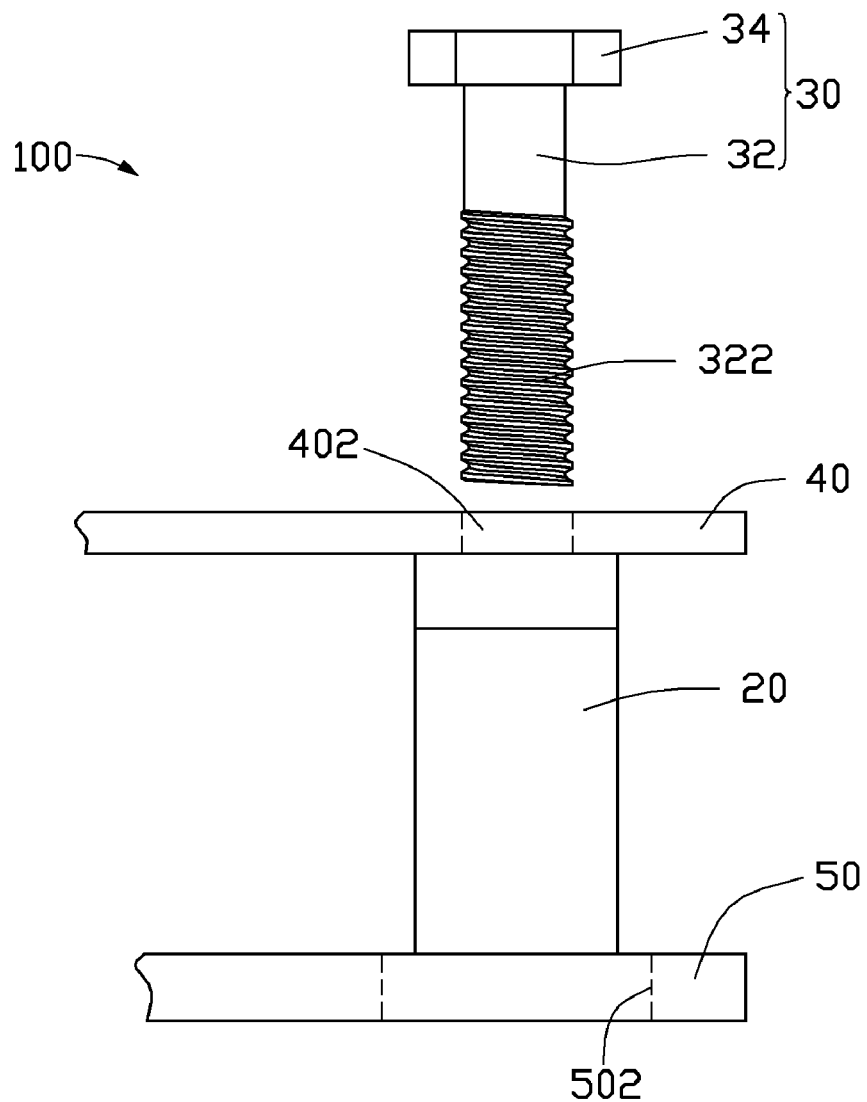
FIG. 3 is a front plane view of the adjustable fastener of FIG. 1 to be engaged with a mating fastener and used to connect two panels.

Referring to FIG. 3, an embodiment of a connecting assembly 100 includes an adjustable fastener 20, a mating fastener 30, a first panel 40 and a second panel 50. The first panel 40 and the second panel 50 are connected together by the adjustable fastener 20 and the mating fastener 30.

Figure 1:
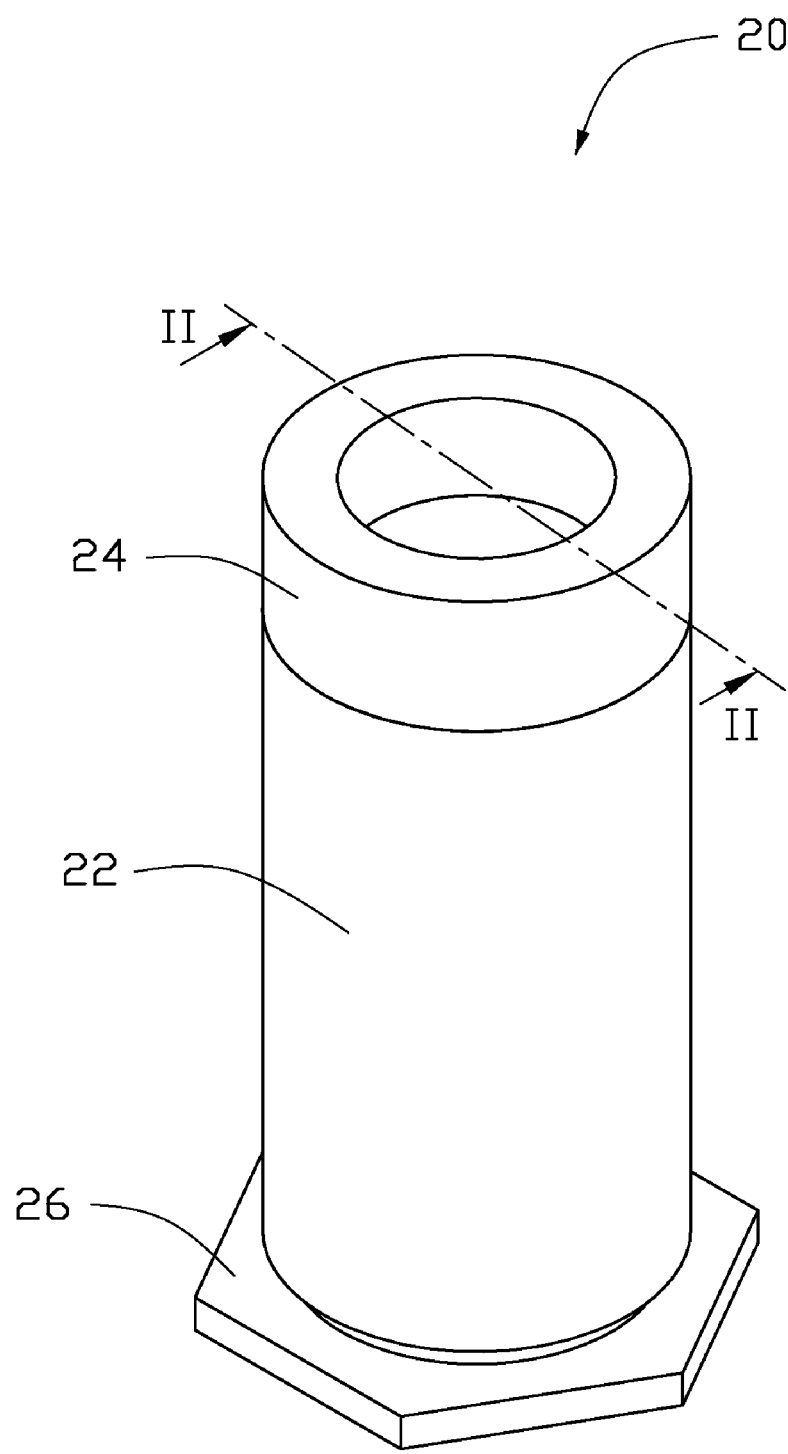
FIG. 1 is a perspective view of one embodiment of an adjustable fastener.

Referring to FIG. 1, one embodiment of an adjustable fastener 20 includes a main body 22, an elastic portion 24, and a flange 26. The elastic portion 24 and the flange 26 are positioned at opposite ends of the main body 22.

Figure 2:
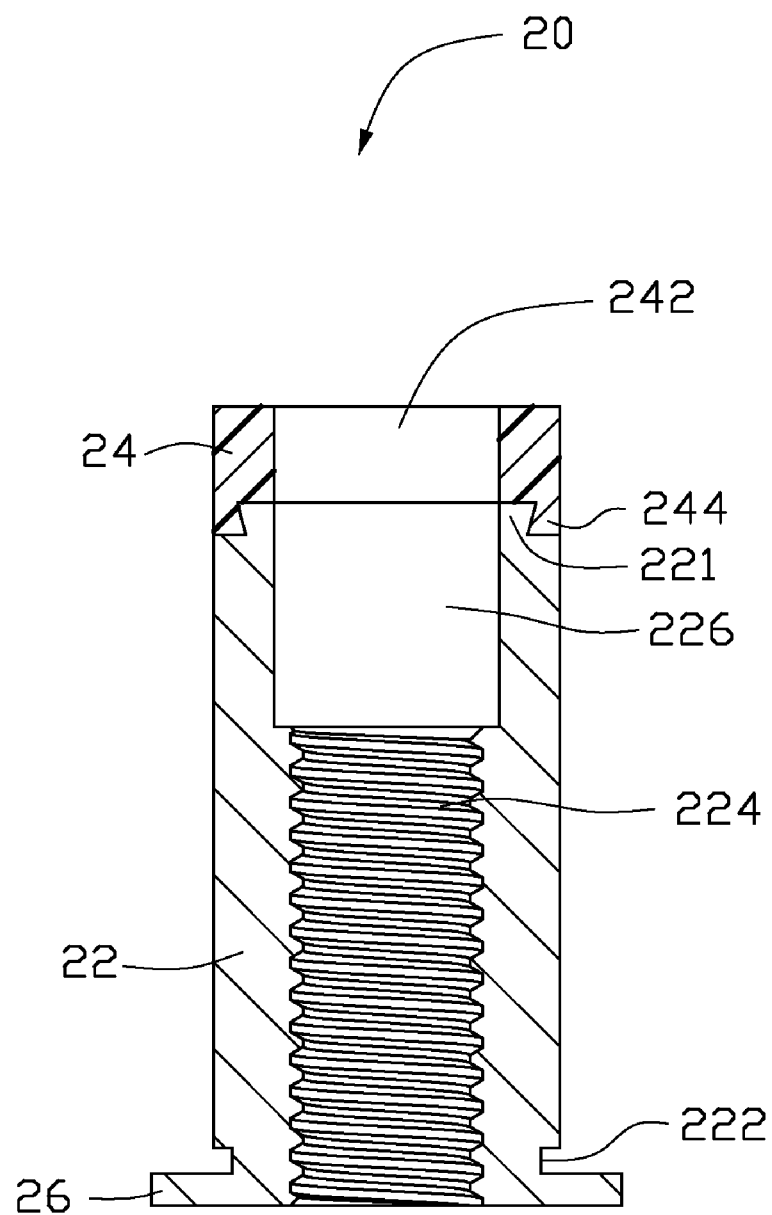
FIG. 2 is a cross-sectional view of the adjustable fastener taken along line II-II of FIG. 1.

Referring to FIG. 2, the main body 22 forms an attaching portion 221 at an end adjacent to the elastic portion 24 and defines a neck groove 222 in an end adjacent to the flange 26. The main body 22 may have a rectangular cross section, a square cross section, a triangular cross section, and so on. In the illustrated embodiment, the main body 22 is substantially cylindrical, having a circular cross-section. The main body 22 further defines a threaded engaging hole 224 and a receiving hole 226 communicating with the threaded engaging hole 224. The receiving hole 226 is adjacent to the elastic portion 24. The threaded engaging hole 224 has a diameter smaller than the receiving hole 226. It may be appreciated that the threaded engaging hole 224 may be a through hole extending through the flange 26 or a blind hole.

The elastic portion 24 has a cross section similar to the cross section of the main body 22. The cross section of the elastic portion 24 may be a rectangular cross section, a square cross section, a triangular cross section, and so on. In the illustrated embodiment, the elastic portion 24 is substantially cylindrical, having a circular cross-section. The elastic portion 24 forms a sleeving portion 244 at an end and defines an extending hole 242 communicating with the receiving hole 226 of the main body 22. The extending hole 242 has a diameter substantially equal to the receiving hole 226. The attaching portion 221 of the main body 22 and the sleeving portion 244 of the elastic portion 24 have an oblique ring-shaped surface, such that the attaching portion 221 firmly engages with the sleeving portion 244. The extending hole 242, the threaded engaging hole 224, and the receiving hole 226 are coaxial. The elastic portion 24 is deformable and may be made of nickel-beryllium-magnesium alloy. Alternatively, the elastic portion 24 may be made of other elastic alloys such as ferrum-manganese alloy, or rubber.

Referring to FIG. 3, the mating fastener 30 includes a head 34 and a shaft portion 32 including a threaded portion 322 corresponding to the threaded engaging hole 224. The first panel 40 defines a first connecting hole 402, and the second panel 50 defines a second connecting hole 502.

When connecting the first panel 40 and the second panel 50, the flange 26 of the adjustable fastener 20 is engaged, for example being riveted, in the second connecting hole 502 of the second panel 50. In the process of engaging the adjustable fastener 20 to the second panel 50, displaced material from the second panel 50 around the second connecting hole 502 is displaced into the neck groove 222 of the adjustable fastener 20, thus fixing the adjustable fastener 20 to the second panel 50. The first panel 40 is disposed adjacent to the elastic portion 24 of the adjustable fastener 20, such that the first connecting hole 402 is substantially aligned with the extending hole 242. The shaft portion 32 of the mating fastener 30 extends through the first connecting hole 402, the extending hole 242, and the receiving hole 226, and into the threaded engaging hole 224. The threaded portion 322 of the mating fastener 30 engages with the threaded engaging hole 224. The mating fastener 30 may be turned clockwise or counterclockwise to adjust a length of the elastic portion 24, so that a proper distance and a proper parallelism between the first and second panels 40, 50 may be obtained. Therefore, the distance between the first panel 40 and the second panel 50 can be adjusted to a predetermined value more accurately. Generally, a plurality of adjustable fasteners 20 are adopted to connect the first panel 40 to the second panel 50. Therefore, the parallelism between the first panel 40 and the second panel 50 can be adjusted to a desirable value by adjusting spacing at different locations of the adjustable fastener 20. In addition, the elastic member 24 of the adjustable fastener 20 can absorb shock.

Figure 4:
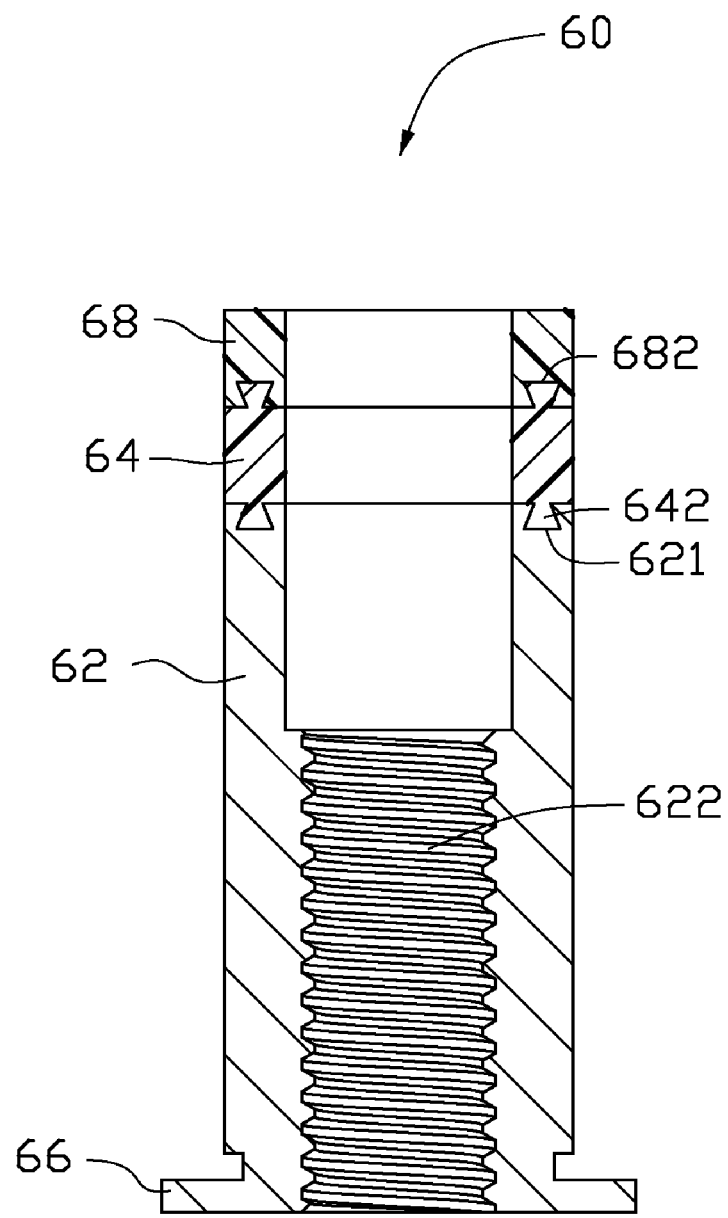
FIG. 4 is a cross-sectional view of another embodiment of an adjustable fastener.

Referring to FIG. 4, another embodiment of an adjustable fastener 60 is similar to the adjustable fastener 20 except that the adjustable fastener 60 further includes a supporting end 68 besides a main body 62, an elastic portion 64, and a flange 66. The elastic portion 64 and the flange 66 are positioned at opposite ends of the main body 62. The supporting end 68 is formed on an end of the elastic portion 64 opposite to the main body 62. The main body 62 forms an attaching portion 621 at an end adjacent to the elastic portion 64 and defines a neck groove (not labeled) in an end adjacent to the flange 66. The main body 22 further defines a threaded engaging hole 622. The elastic portion 64 forms two sleeving portions 642 at opposite ends. The supporting end 68 forms an attaching portion 682 at an end adjacent to the elastic portion 64. The two sleeving portions 642 of the elastic portion 64 are firmly engaged with the attaching portion 621 of the main body 62 and the attaching portion 682 of the supporting member 68, respectively. In the illustrated embodiment, the attaching portions 621, 682 are dovetail slots, and the sleeving portions 642 are dovetail protrusions. A length of the elastic portion 64 of the adjustable fastener 60 can also be adjusted by adjusting a mating fastener 30 inwards or outwards from the adjustable fastener 60, such that a proper distance and a proper parallelism between two panels may be obtained. The supporting end 68 is made of a rigid material such as a rigid metal.

Alternatively, the adjustable fasteners 20, 60 may be adopted to connect more than two components. The adjustable fastener 20 may have other structures, for example, the flange 26, the neck groove 222, and the threads in the threaded engaging hole 224 may be omitted or instead replaced with other structures, so long that the adjustable fastener 20 can connect the first panel 40 with the second panel 50, and the elastic portion 24 is deformable. For example, the main body 22 of the adjustable fastener 20 may form outer threads and the second panel 50 may define a threaded hole for engaging with the outer threads of the adjustable fastener 20, thereby omitting the flange 26. That is, the engagement of the flange 26 and the second connecting hole 502 can be replaced with the engagement of the outer threads of the adjustable fastener 20 and the threaded hole of the second panel 50. Alternatively, the second panel 50 may define a threaded hole, such that the mating fastener 30 runs through the first panel 40 and engages with the threaded hole of the second panel 50, thereby omitting the flange 26 and the threaded engaging hole 224, 622 need not be threaded.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An adjustable fastener, comprising:
    a main body defining a threaded engaging hole within one end of the main body, and a receiving hole within an opposite end of the main body; wherein the receiving hole coaxially communicates with the threaded engaging hole; and the main body further comprises an attaching portion on an end away from the threaded engaging hole;
    an elastic portion coaxially connected to an end of the main body away from the threaded engaging hole, and defining an extending hole communicating with the receiving hole of the main body, each of two sleeving portions is formed on an opposite end of the elastic portion; and
    a supporting member made of rigid material and attached to a distal end of the elastic portion opposite to the main body, the supporting member comprises an attaching portion on an end corresponding to one of the two sleeving portions of the elastic portion;
    wherein, the elastic portion is deformable and elastically sandwiched between the main body and the supporting member thereby changing a total length of the adjustable fastener, one of the two sleeving portions is firmly engaged with the attaching portion of the main body, and another one of the two sleeving portions is engaged with the attaching portion of the supporting member.

2. The adjustable fastener of claim 1, wherein the adjustable fastener further comprises a flange formed at end of the main body opposite to the elastic portion.

3. The adjustable fastener of claim 2, wherein the main body defines a neck groove in an end adjacent to the flange and the neck groove is coaxial with the threaded engaging hole.

4. The adjustable fastener of claim 1, wherein the attaching portion of the main body and the sleeving portion of the elastic portion both have an oblique ring-shaped surface, such that the attaching portion firmly engages with the sleeving portion.

5. The adjustable fastener of claim 4, wherein the attaching portions are dovetail slots, and the sleeving portions are dovetail protrusions.

6. A connecting assembly comprising:
    a first panel defining a first connecting hole;
    a second panel defining a second connecting hole;
    an adjustable fastener engaged in the second connecting hole of the second panel and positioned between the first panel and the second panel; wherein the adjustable fastener is adapted to adjust a distance between the first and second panels; and the adjustable fastener comprises:
    a main body defining a threaded engaging hole within one end of the main body, and a receiving hole within an opposite end of the main body; wherein the receiving hole coaxially communicates with the threaded engaging hole; and the main body further comprises an attaching portion on an end away from the threaded engaging hole;
    a deformable elastic portion coaxially connected to an end of the main body away from the threaded engaging hole, and defining an extending hole communicating with the receiving hole of the main body, each of two sleeving portions is formed on an opposite end of the elastic portion; and
    a supporting member made of rigid material and attached to a distal end of the elastic portion opposite to the main body, the supporting member comprising an attaching portion on an end corresponding to one of the two sleeving portions of the elastic portion; wherein the elastic portion is deformable and elastically sandwiched between the main body and the supporting member thereby changing a total length of the adjustable fastener, one of the two sleeving portions is firmly engaged with the attaching portion of the main body, and another one of the two sleeving portions is engaged with the attaching portion of the supporting member; and
    a mating fastener comprising a head and a shaft portion, the shaft portion having a threaded portion positioned away from the head; the threaded portion engages with the threaded engaging hole of the main body by passing through the first connecting hole of the first panel, the supporting member, the extending hole and the receiving hole of the main body; thereby adjusting a length of the adjustable fastener and a distance and a parallelism between the first and second panels.

7. The connecting assembly of claim 6, wherein the adjustable fastener further comprises a flange formed at end of the main body opposite to the elastic portion.

8. The connecting assembly of claim 7, wherein the main body defines a neck groove in an end adjacent to the flange.

9. The connecting assembly of claim 6, wherein the attaching portion of the main body and the sleeving portion of the elastic portion both have an oblique ring-shaped surface, such that the attaching portion firmly engages with the sleeving portion.

10. The connecting assembly of claim 9, wherein the attaching portions are dovetail slots, and the sleeving portions are dovetail protrusions engaging with the corresponding attaching portions.

* * * * *